United States Patent [19]

Yamamoto et al.

[11] Patent Number: 5,457,489
[45] Date of Patent: Oct. 10, 1995

[54] IMAGE FORMING APPARATUS USING PULSE WIDTH MODULATION

[75] Inventors: Hiroyuki Yamamoto; Satoshi Haneda; Kouichi Takaki; Kouichi Sawada, all of Hachioji, Japan

[73] Assignee: Konica Corporation, Tokyo, Japan

[21] Appl. No.: 47,963

[22] Filed: Apr. 15, 1993

[30] Foreign Application Priority Data

Apr. 30, 1992 [JP] Japan ............ 4-111681

[51] Int. Cl.$^6$ ............ H04N 1/21
[52] U.S. Cl. ............ 347/247; 347/251
[58] Field of Search ............ 346/1.1, 107 R, 346/76 L, 108, 160; 358/296, 298, 300, 302; 347/251, 247, 131

[56] References Cited

U.S. PATENT DOCUMENTS

| | | | |
|---|---|---|---|
| 4,142,210 | 2/1979 | Otobe et al. | 346/76 L |
| 4,688,017 | 8/1987 | Huebner et al. | 341/137 |
| 4,862,289 | 8/1989 | Shimada . | |

FOREIGN PATENT DOCUMENTS

| | | |
|---|---|---|
| 62-183663 | 8/1987 | Japan . |
| 2229833 | 10/1990 | United Kingdom . |

*Primary Examiner*—Mark J. Reinhart
*Attorney, Agent, or Firm*—Frishauf, Holtz, Goodman, Langer & Chick

[57] ABSTRACT

An image forming machine in which an image is formed on a recording material by an imagewise exposure to a light source that is modulated in accordance with to an image signal. The machine includes a device for generating a reference wave with a predetermined frequency, a generator for generating a pulse width modulating signal to modulate the light source in accordance with the image signal and the reference wave. A ratio of the frequency of the image signal to the predetermined frequency of the reference wave is set based on a relationship $1:(1+n/m)$ where n and m are positive integers and n is less than m.

2 Claims, 11 Drawing Sheets

IMAGE FORMING APPARATUS USING PULSE WIDTH MODULATION

BACKGROUND OF THE INVENTION

The present invention relates to an image forming apparatus, and particularly to an image forming apparatus wherein pulse width modulation signals corresponding to image signals are obtained and a light source is controlled in accordance with the pulse width modulation signals.

Heretofore, in an image forming apparatus of a type mentioned above, when images are formed employing a laser beam printer based on digitized image signals, digital signals have been converted to analog signals, and the converted signals have been compared with periodical pattern signals (reference wave) such as a triangular wave to generate pulse width modulation signals in order to obtain gradation properties. Then, a laser beam (light source) has been controlled by the pulse width modulation signals generated so that images may be formed on a photoreceptor by means of a laser beam. (see Japanese Patent Publication Open to Public Inspection (hereinafter, referred to as Japanese Patent O.P.I. Publication) No. 183663/1987.)

FIG. 12 shows a conventional modulation circuit for forming pulse width modulation signals.

Here, dot clock DCK synchronized with pixel data DATA is supplied to integrator 22 composed of variable resistor 22a and capacitor 22b through buffer 21. Output signals from the integrator 22 are sent to comparator 26 through a series circuit including resistor 23, buffer 24 and capacitor 25 for cutting DC as pattern signals Sp (reference wave).

The amplitude of the pattern signals Sp is adjusted by the variable resistor 22a so that the overall pattern signals Sp is contained in the full scale (00H to FFH in terms of 8 bits) of D/A converter 28 described later, and an off-set value (DC value) is adjusted by means of variable resistor 27.

In addition, pixel data DATA is sent to D/A converter 28 to be converted to an analog signal and then, it is sent to the comparator 26 as image signal Sv. CLK is a clock for D/A converting.

In the comparator 26, pattern signal Sp sent from the integrator 22 and image signal Sv sent from the D/A converter 28 are compared. Then, from this comparator 26, pulse width modulation signals SPWM based on pixel data DATA is outputted.

In the constitution, when the dot clock DCK is one as shown in FIG. 13A, pattern signal with triangular wave Sp is supplied to the comparator 26 as shown by the solid line in FIG. 13B. Accordingly, when image signal Sv is shown by a dot line in FIG. 13B, pulse width modulation signal SPWM having the same frequency as that of dot clock is outputted from the comparator 26 as shown in FIG. 13C.

Incidentally, remarkable distortion sometimes occurred on the wave form of the dot clock DCK employed for forming the pattern signal Sp in the manner, due to a standing wave generated during transmission or a noise from outside. Thereby there was a fear that the pulse width modulation signal SPWM could not be formed correctly, resulting in deterioration in the reproducibility of gradation of reproduced image.

In order to prevent generating of distortion in the dot clock DCK, it is considered to remove duty ratio change by demultiplying the dot clock DCK.

The solid line in FIG. 13D shows a pattern signal Sp formed by demultiplying the dot clock DCK into two. By the use of the pattern signal Sp, pulse width modulation signal SPWM having the frequency which is double that of the dot clock can be obtained as shown in FIG. 13E.

Since the dot clock DCK is demultiplied to be used, the pulse width modulation signal SPWM having the frequency which is double that the dot clock is not affected by the duty ratio change of the dot clock. Therefore, deterioration in gradation reproduction on a reproduced image can be prevented. In addition, a constitution wherein the pulse width modulation signal SPWM having the same frequency as the frequency of the dot clock is generated has an advantage to obtain high resolution by securing sampling number.

Accordingly, heretofore, in images wherein resolution of a character image is considered important, it was generally conducted to change the frequency of a reference wave, i.e., the ratio of the frequency of an image signal to that of pattern signal (the reference wave) was set to 1:1 for images such as character images whose resolution is important, and the ratio was arranged 1:2 in the case of photographic image wherein gradation reproducibility was considered important.

However, even in the case of changing the frequency in accordance with images mentioned above for use, there was a problem that sampling number was reduced and resolution was deteriorated when the frequency of a reference wave was set to be double that of image signal for forming accurate pulse width modulation signal SPWM. To the contrary, when resolution was considered to be important, there was a problem that gradation reproducibility was reduced by being influenced by duty ratio change of the dot clock as mentioned above. Thus, resolution and gradation reproducibility were contradictory to each other.

SUMMARY OF THE INVENTION

The object of the present invention is to provide an image resolution and a gradation reproducibility to at a high level in an image forming apparatus wherein a pulse width modulation signal is formed by comparing a pattern signal formed on the basis of a dot clock with an image signal.

Accordingly, an image forming apparatus in the present invention is an image forming apparatus wherein images are exposed to be formed on a recording medium by controlling a light source in accordance with each image signal, comprising a reference wave generating means for generating a reference wave having the predetermined frequency and a modulation signal generating means for generating a pulse width modulation signal for controlling the light source based on the image signal and the referential signal. The ratio of the frequency of the image signal to that of the reference wave is determined to be 1:(1+n/m) provided that n and m are positive integers and n<m.

In an image forming apparatus having the configuration of the present invention, resolution can be improved by using a sampling number compared with the case when the ratio of the frequency of image signal to that of the reference wave is fixed to be 1:2 (as in the prior art) because the ratio of the frequency of the image signal to that of the reference wave in the present invention has been is determined to be 1:(1+n/m) In addition, even when fluctuations occur in the clock signal when generating the reference wave based on the clock signal of the image signal, a reference wave that is free of the influence from fluctuations can be formed by dividing the clock signal employed, and thereby a deterioration in gradation reproducibility influenced by the fluctuation can be prevented.

DETAILED DESCRIPTION OF THE PREFERRED EMBODIMENTS

Hereunder, we will explain examples of the present invention.

Figure 10:
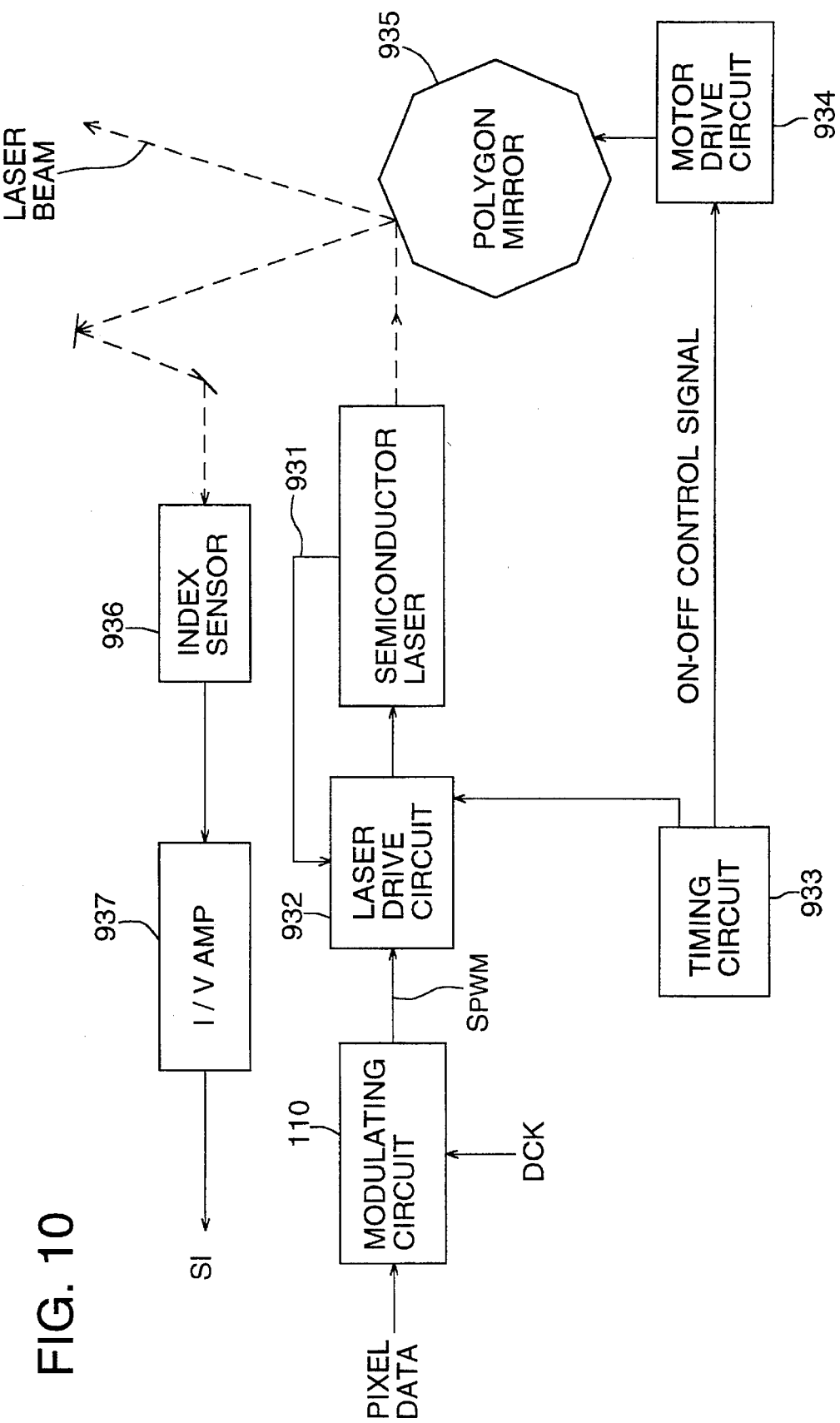
FIG. 10 is a block diagram showing an example of constitution of a laser beam printer.

FIG. 10 shows a block diagram showing a basic constitution of a laser beam printer which represents an image forming apparatus in the present invention, and is applied to a digital copying machine. As a laser beam printer in the present example, an electrophotographic printer employing a photoreceptor drum is used and a laser beam is used as a light source forming electrostatic latent images on a photoreceptor drum.

In FIG. 10, digitized pixel data DATA outputted from a scanner unit not illustrated is supplied to modulation circuit 110, where pulse width modulation signals SPWM is formed based on the pixel data DATA.

The pulse width modulation signal SPWM formed in the modulation circuit 110 is supplied to semiconductor laser 931 (the light source) through a laser drive circuit 932. By means of the modulation signal SPWM, the semiconductor laser 931 is controlled. The laser drive circuit 932 is controlled by controlling signals from the timing circuit 933 so that it is in the state of driving only in the horizontal and vertical effective section.

To the laser drive circuit 932, signals showing the amount of laser beam from the semiconductor laser 931 are fed back, and the drive of semiconductor laser 931 is controlled so that the amount of laser beam may be kept constant.

Laser beam emitted from the semiconductor laser 931 is sent to polygon mirror 935 to be deflected thereon. The starting point for scanning by means of the laser beam deflected by the polygon mirror 935 is detected by index sensor 936. The detected signal is converted to voltage signals by an amplifier 937 for current/voltage conversion so that the index signal SI is formed. The index signal SI is sent to a control means controlling the timing of optical scanning in the scanner unit.

The numeral 934 is a drive circuit of a motor rotating the polygon mirror 935, whose on-off signals for the drive circuit are supplied from the timing circuit 933.

Figure 11:
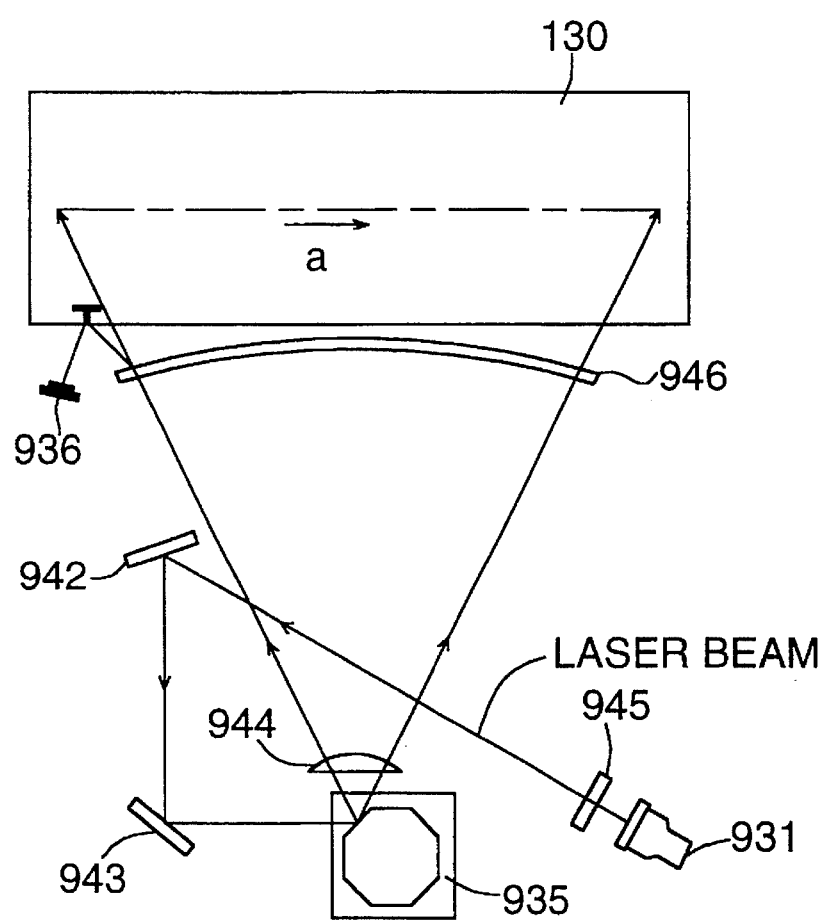
FIG. 11 is a system diagram showing an imagewise exposure system in a laser beam printer.

FIG. 11 is an example of an imagewise exposure system (laser beam scanner) through which an image is formed by a laser beam.

Laser beam emitted from the semiconductor laser 931 is projected on the polygon mirror 935 through the mirrors 942 and 943. By the polygon mirror 935, the laser beam is deflected, and the deflected laser beam is projected on the surface of photoreceptor drum 130 (a recording medium) through an fθ lens 944 for determining the diameter of a beam.

Incidentally, 945 and 946 are cylindrical lenses for correcting inclination angles, where the laser beam scans the surface of photoreceptor drum 130 through the polygon mirror 935 in a prescribed direction at a certain speed and thereby exposure corresponding to the pixel data is conducted so that static latent images are formed on the photoreceptor drum 130.

Then, toner charged, through the known constitution, to the polarity opposite to that of the static latent images is made to adhere to the static latent images to be developed. Then, a recording paper is superposed onto a toner image, a charge having a reverse polarity to the toner image is given to the recording paper from the rear side of the recording paper with the corona charger, so that toner images are transferred onto the recording paper. In addition, heat or pressure is applied to the transferred toner image to fix the transferred toner image to the recording paper.

Figure 1:
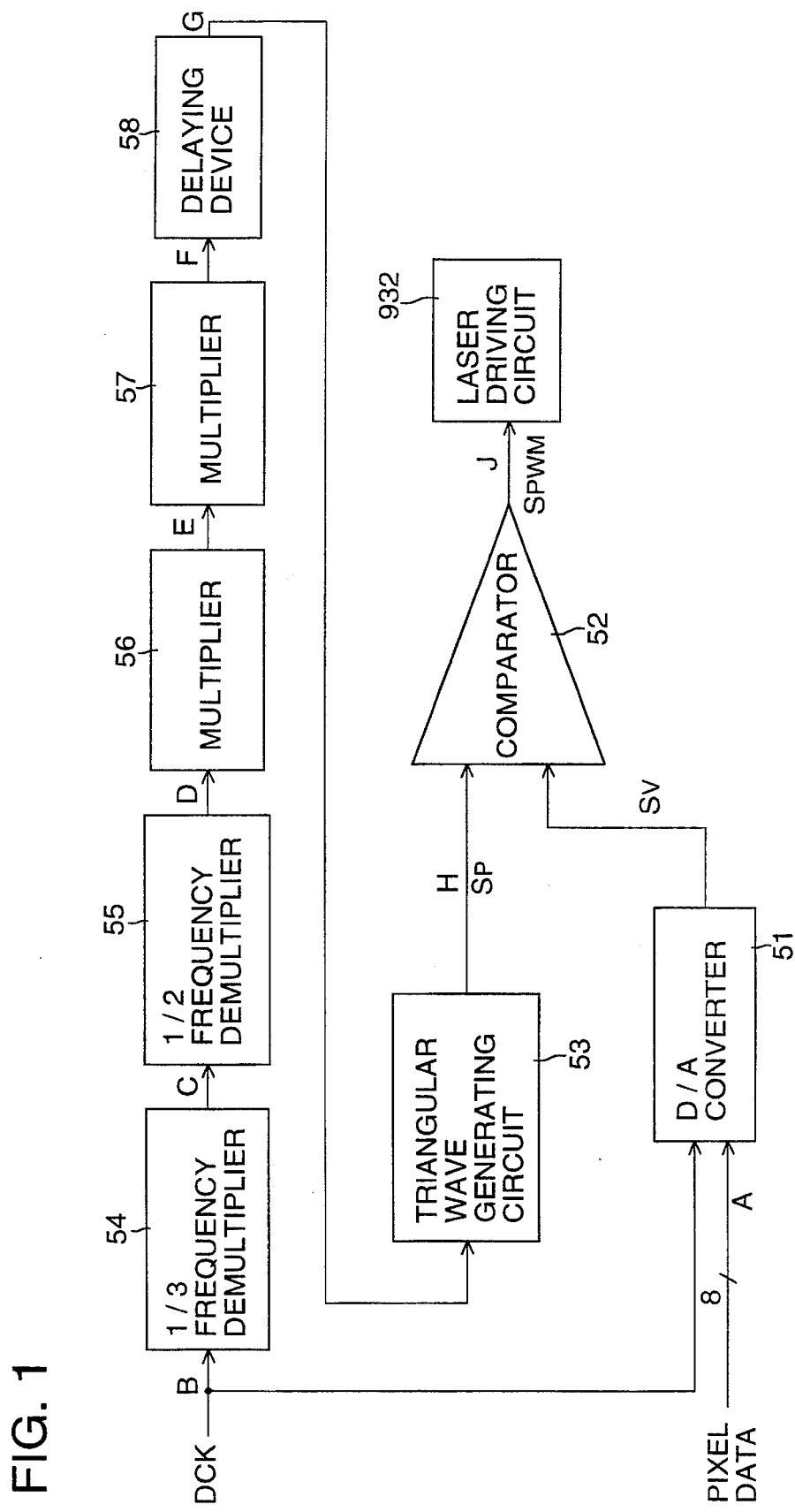
FIG. 1 is a block diagram showing the constitution of modulation circuit in examples.

Next, detailed constitution of the modulation circuit 110 is explained, referring to FIG. 1.

D/A converter 51 converts digitized pixel data DATA to an analog signal that is synchronized with the dot clock DCK. Analog image signals Sv outputted from the D/A converter 51 and are supplied to comparator 52 as a means for generating modulation signals.

The comparator 52 outputs pulse width modulation signals SPWM for controlling the laser beam based on a comparison between a triangular wave Sp having a prescribed frequency as a reference wave supplied from a triangular wave generating circuit 53 and the image signals Sv. The pulse width modulation signal SPWM is supplied to the laser drive circuit 932, where the semiconductor laser 931 is controlled in accordance with the PIXEL DATA.

Figure 12:
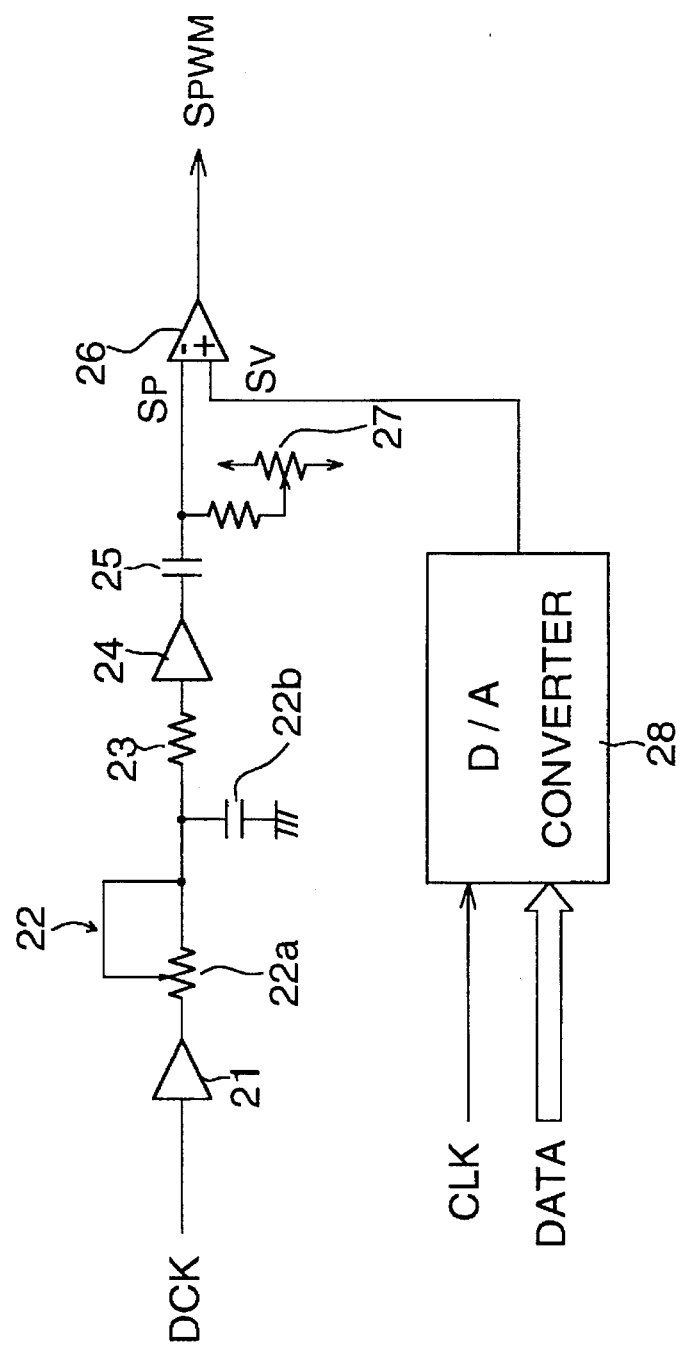
FIG. 12 is a circuit diagram showing a conventional modulation circuit.
Figure 13:
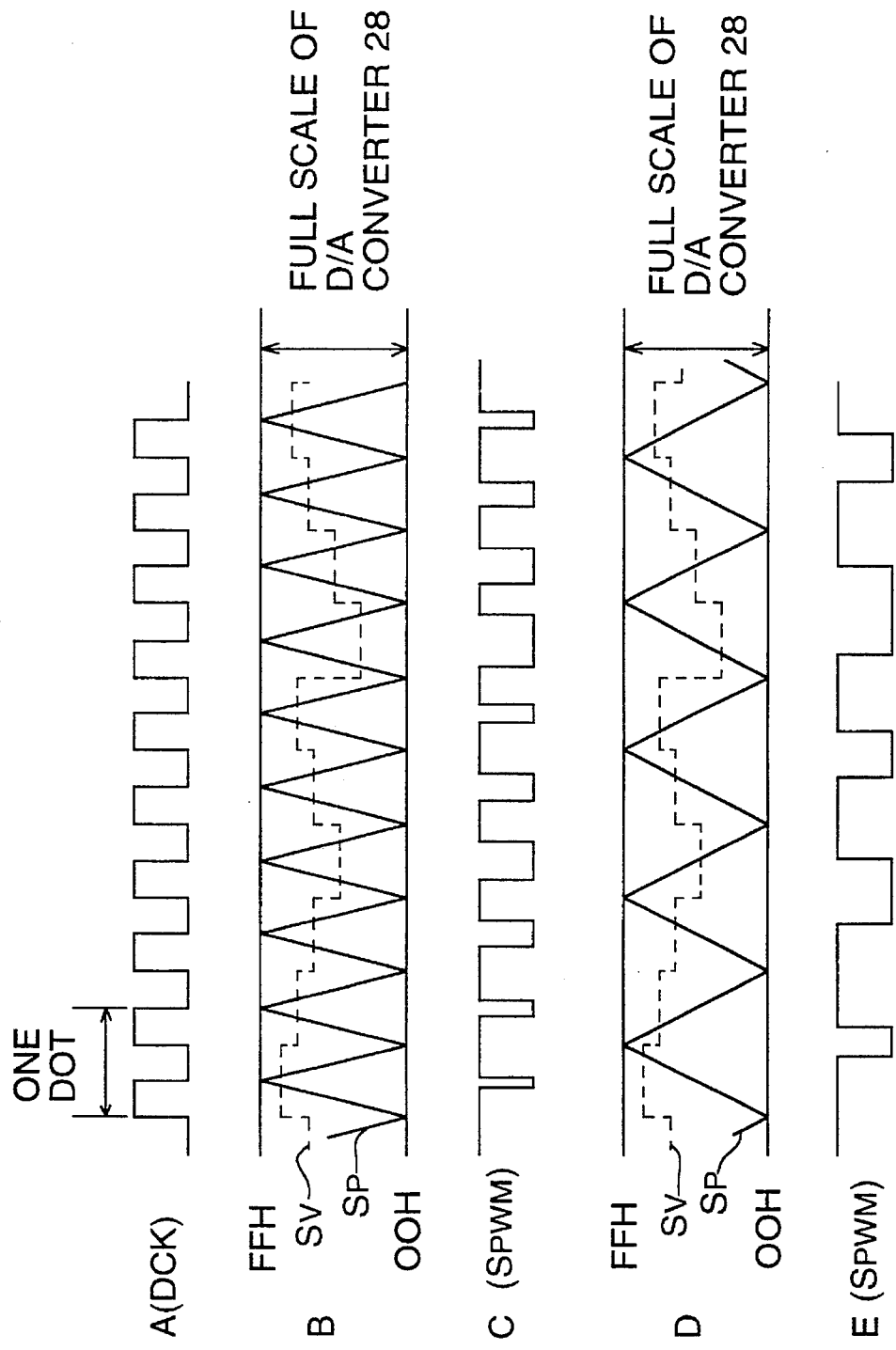
FIG. 13 is a time chart showing operation of formation of conventional modulation pulse signal.

The triangular wave generating circuit 53 is a circuit generating a triangular wave in accordance with the pulse signal of prescribed frequency supplied. It is composed of a buffer, an integrator, a resistor, a capacitor for cutting DC and the like (see as shown in FIG. 12 (prior art)).

Figure 5:
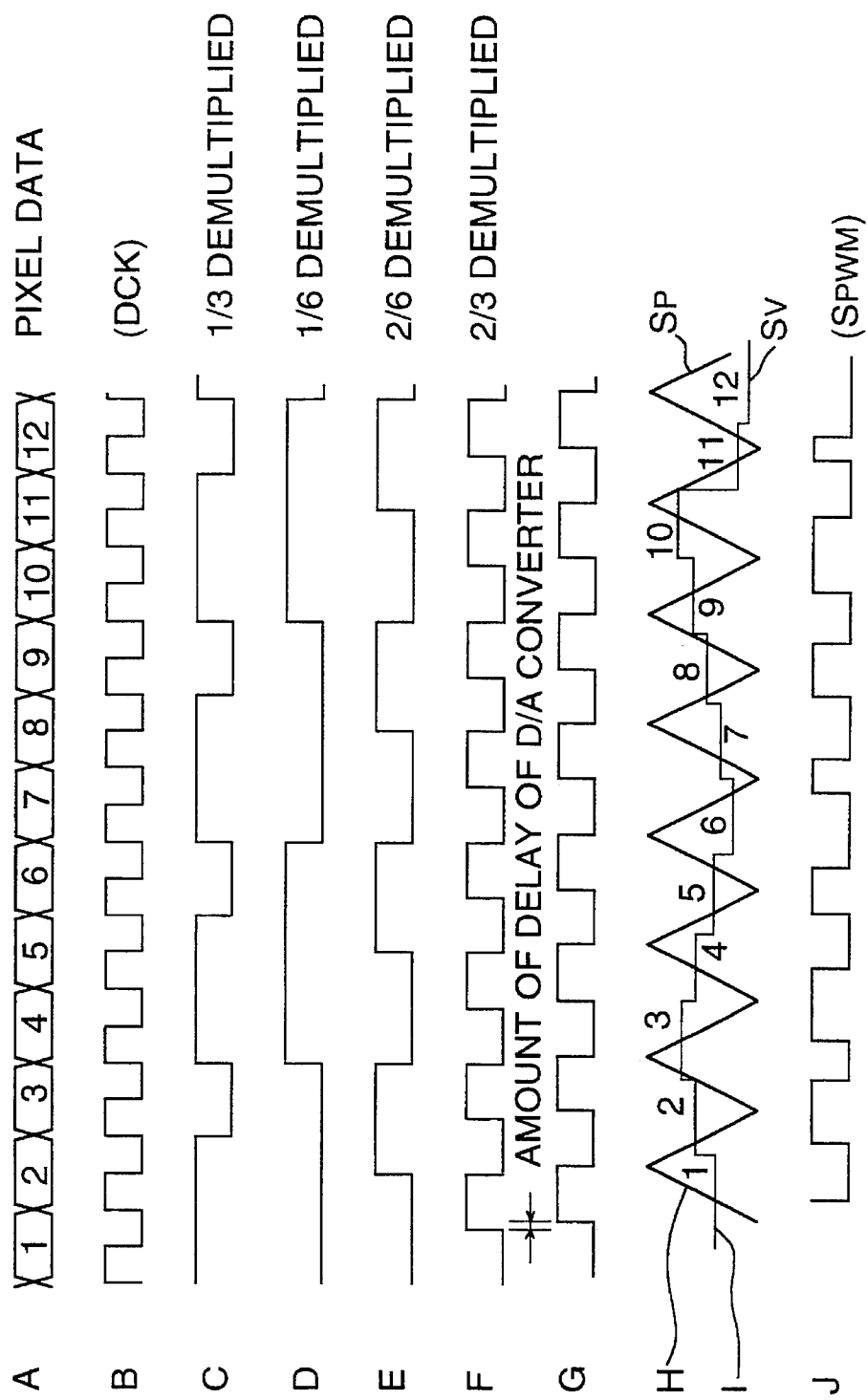
FIG. 5 is a time chart showing modulation property of examples.

The frequency of the pulse signals (see FIGS. 5F and 5G) supplied to the triangular wave generation circuit 53 is, based on the dot clock DCK waveform shown in FIG. 5B, is which different from that of the dot clock DCK (⅔ frequency described later). In order to change the frequency, ⅓ frequency demultiplier 54, ½ frequency demultiplier 55, multiplier 56, a multiplier 57 and a delaying device 58 are provided. In the present example, a means for generating the reference wave is comprised of the triangular wave generation circuit, the ⅓ frequency demultiplier 54, the ½ frequency demultiplier 55, the multiplier 56, the multiplier 57 and the delaying device 58.

Figure 2:
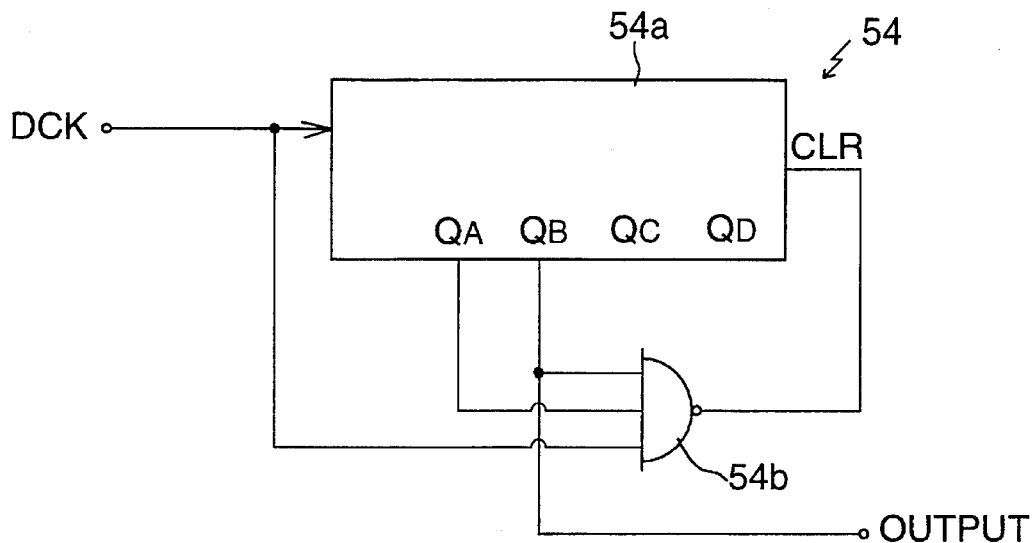
FIG. 2 is a circuit diagram showing an example of ⅓ frequency demultiplier.

Signals from the dot clock are, firstly, subjected to demultiplying wherein the frequency is demultiplied to ⅓ by means of the ⅓ frequency demultiplier 54. As shown in FIG. 2, the ⅓ frequency demultiplier 54 includes up-counter 54a and NAND circuit 54b for resetting the up-counter 54b.

Figure 3:
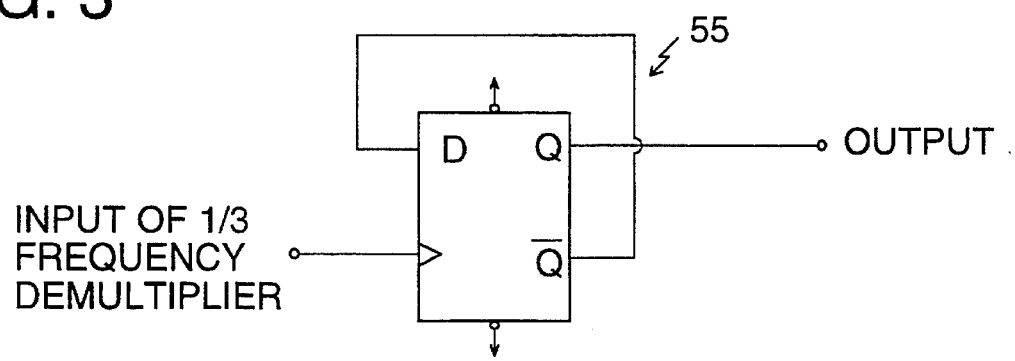
FIG. 3 is a circuit diagram showing an example of ½ frequency demultiplier.

Here, due to ⅓ frequency demultiplying by means of the ⅓ frequency demultiplier 54 including the up counter, the frequency is reduced to ⅓ (the cycle becomes 3 times). However, the duty ratio of the pulse signals after being subjected to the frequency demultiplying is not 50%, as shown in FIG. 5C. Therefore, they are subjected to ½ frequency demultiplying by means of the ½ frequency demultiplyer 55 including a D type flip-flop device as shown in FIG. 3 wherein the frequency of the signals outputted from the ⅓ frequency demultiplier 54 is reduced to ½.

Thereby, as shown in FIG. 5D, pulse signals having a duty ratio of 50% wherein the dot clock is subjected to ⅙ frequency demultiplying (the frequency is reduced to ⅙, in other words, the cycle is increased 6 times) is outputted from the ½ frequency demultiplier.

The output from the ½ frequency demultiplier 55 is supplied to the multiplier 56 which doubles the frequency (a cycle is halved). In addition, the output from multiplier 56 is supplied to a multiplier 57 which doubles the frequency. From the multiplier 57, pulse signals wherein frequency from the dot clock have been subjected to ⅘ frequency demultiplying are outputted.

Figure 4:
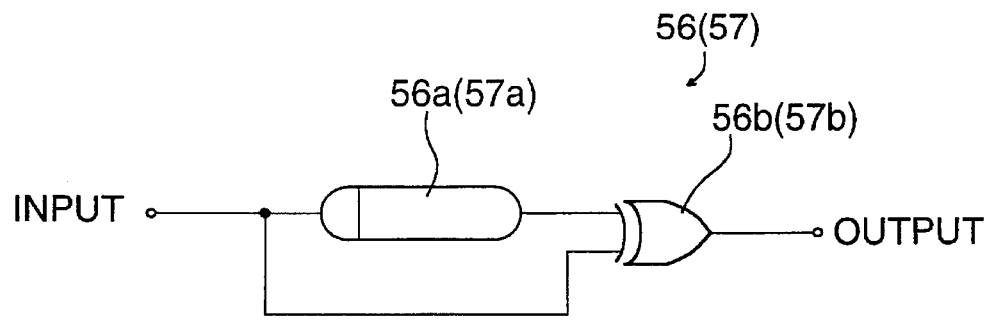
FIG. 4 is a circuit diagram showing an example of the constitution of delaying device.

Incidentally, as shown in FIG. 4, the multipliers 56 and 57 are composed of delay lines 56a and 57b and EX-OR circuits (exclusive-OR circuits) 56b and 57b. The delay time in the delay lines 56a and 57b are set to the level that is 1.5 times that of the dot clock cycle in accordance with the processing of doubling the frequency.

Thereby, pulse signals subjected to ⅙ frequency demultiplying are outputted from the ½ frequency demultiplier 55 and are multiplied to ⅓ frequency by means of the multiplier 56, and then, as shown in FIG. 5F, it is multiplied to ⅔ frequency (⁴⁄₆ demultiplying) demultiplying by means of the next multiplier 57.

The purpose of the delaying device in the final step is to synchronize D/A-converted image signal Sv with the triangular wave Sp as a reference wave (see FIGS. 5F and G).

As described above, pulse signals wherein the frequency from the dot clock DCK was subjected to ⅔ frequency demultiplying (the number of cycles was increased to 3/2 times of the dot clock DCK) are supplied to the triangular wave generating circuit 53. In triangular wave generating circuit 53, a triangular wave having the same frequency as the pulse signals supplied is generated.

Here, since the frequency of image signal Sv is the same as that of the dot clock DCK, and that of the triangular wave Sp is 3/2 times that of the dot clock DCK, the ratio of the frequency of image signal Sv to that of triangular wave Sp (the reference wave) both to be compared by the comparator 52 is 1:1.5. From the comparator 52, pulse width modulation signals SPWM having the same frequency as the triangular wave Sp is outputted.

Even when a duty ratio change is generated in the dot clock DCK due to a standing wave occurring in the course of transmitting the dot clock DCK and noise from the outside, deterioration of gradation reproducibility can be prevented if a triangular wave Sp is generated based on the pulse signals which demultiplied the dot clock DCK, because the aforesaid constitution wherein a triangular wave Sp is generated employing the demultiplied signal of aforesaid dot clock DCK generates a stable triangular wave Sp not influenced by the duty ratio change and the pulse width modulation signal SPWM can be formed exactly.

However, to extend the frequency of triangular wave Sp against that of the image signal Sv reduces the sampling number and thereby lowers the resolution of the reproduced image. Nevertheless, the sampling number can be secured so that sufficient resolution can be secured when the ratio of the frequency of image signal Sv to that of triangular wave Sp (the reference wave) is set to be 1:1.5 (in 1:(1+n/m), n=1 and m=2) as shown in the present example.

In addition, at the same time, images having high gradation reproducibility which are free from the duty ratio change of the dot clock DCK can be obtained, because the triangular wave Sp is generated not by employing the dot clock DCK as it is but by employing the dot clock DCK subjected to frequency demultiplying. Therefore, resolution and gradation reproducibility can both be of at a high level.

Incidentally, in the example, the ratio of the frequency of image signal Sv to that of triangular wave Sp was determined to be 1:1.5. However, the frequency ratio is not limited thereto. Any ratio represented by 1:(1+n/m) provided that n and m are positive integers and n<m is allowable.

Here, in the case of the constitution wherein a clock signal for the reference wave satisfying the relation of the frequency ratio is formed from the original clock (the dot clock DCK) by means of a combination of a demultiplier and a multiplier as described in the above example wherein, a change in frequency ratio requires a change in the circuit.

Figure 6:
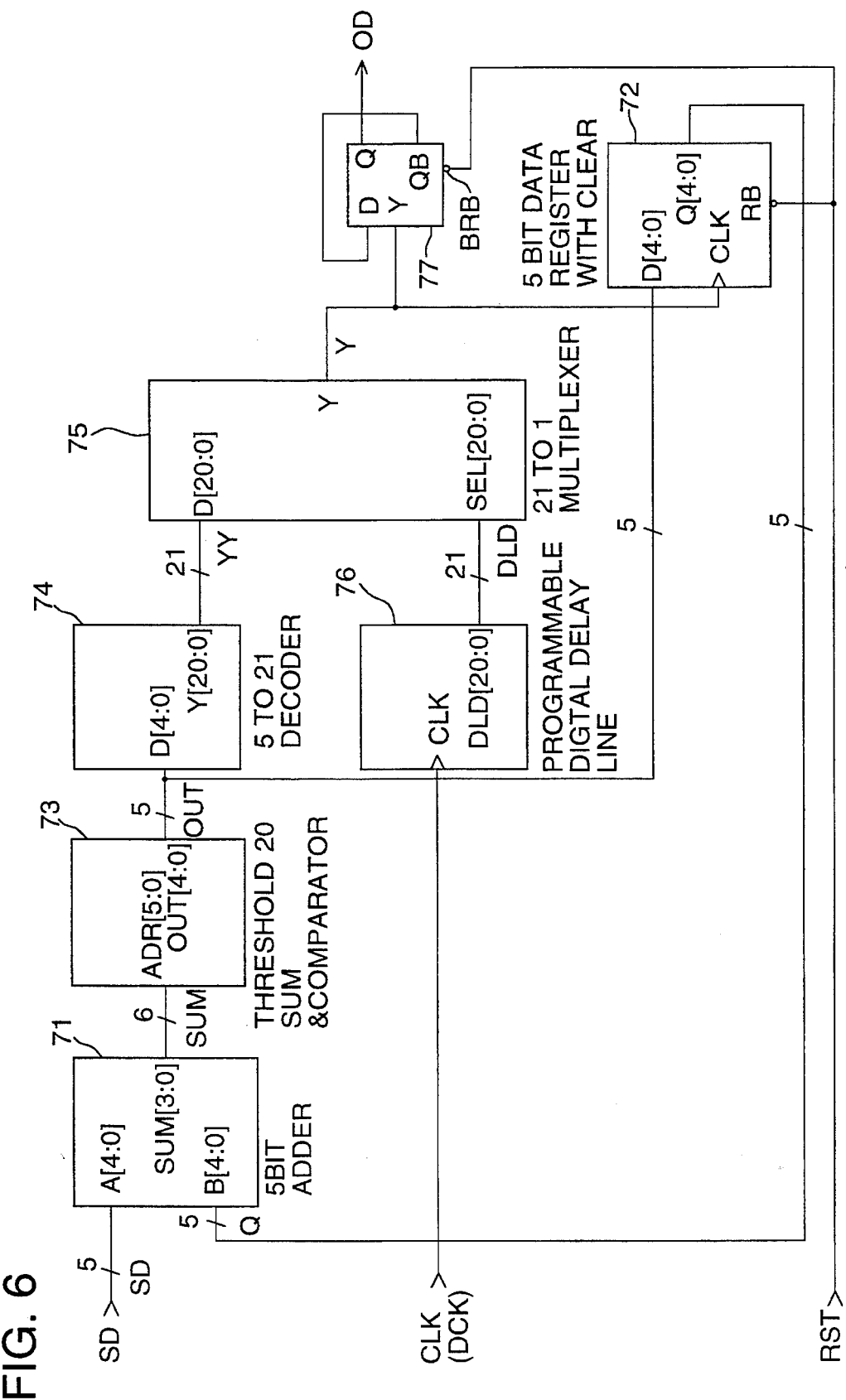
FIG. 6 is a block diagram showing a constitution of variable frequency circuit.

In this connection, when the original clock (the dot clock DCK) is arranged so that it can be demultiplied by the use of a variable frequency demultiplying circuit as shown in FIG. 6, it is possible to cope with the change of setting of the frequency ratio of 1:(1+n/m) in a relatively flexible manner.

Figure 7:
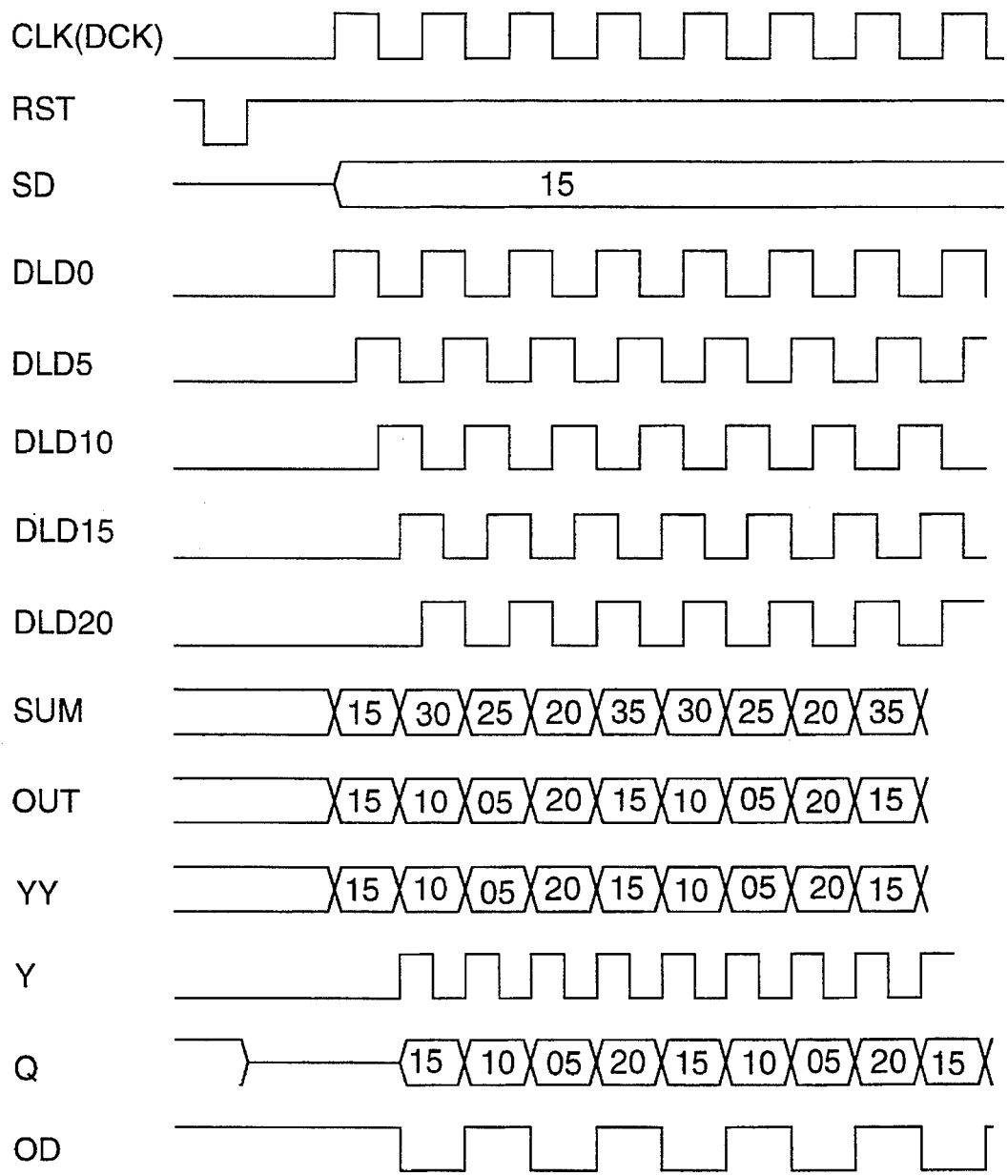
FIG. 7 is a time chart showing an operation of variable frequency circuit.

Here, we will explain the constitution of a variable frequency demultiplying circuit as shown in FIG. 6, referring to the time chart shown in FIG. 7.

In FIG. 6, SD is 5 bit data determining the frequency demultiplying ratio of the original clock. This data of the frequency-demultiplying ratio is inputted into adder 71.

In the adder 71, data Q of 5 bits (in the original state, it is φ) outputted from the data register 72 composed of a D type flip-flop device and the frequency-demultiplying ratio data SD are added, and the result of addition is outputted as addition data SUM (6 bits).

The addition data SUM is supplied to comparator 73. In the comparator 73, the addition data SUM is compared with the threshold level=20. When the addition data SUM exceeds 20, the value of SUM−20 is outputted. When the addition data is not more than 20, the addition data are outputted as they are.

The outputted data OUT from the comparator 73 is supplied to the decoder 74 to be decoded, and supplied to multiplexer 75.

The dot clock DCK is given to programmable digital delay line 76. In the delay line, pulse signals having a plurality of different delay times are generated as delay output DLD.

Incidentally, the delay line 76 in the present example outputs pulse signals having 21 kinds of different phases including a pulse signal having the same phase as the dot clock DCK as delay output DLDs 0 to 20.

The delay outputs DLD 0 to 20 are given to the multiplexer 75, which selects and outputs a prescribed delay output Y from the delay outputs DLD0 to 20, with data YY obtained by decoding the comparative output data OUT as a selection signal.

Delay output Y selected in this manner is supplied to the flip-flop device 77 which latches the final output OD and to the data register 72 as a clock signal. Due to it, the comparative output data OUT is held by the data register 72 at the rise of the delay output Y, and supplied to the adder 71 as data Q.

On the other hand, the flip-flop device 77 is inverted at the rise of the delay output Y and also inverted at the rise of the delay output Y selected subsequently. This repeated output OD (output having frequency which is half that of the delay output Y) is the output of the frequency demultiplying clock calculated in advance by the frequency demultiplying data SD against the dot clock DCK.

Namely, by switching selecting delay outputs DLD 0 to 20 outputted from the delay line 76 successively in the combination of the adder 71 and the comparator 73, frequency-demultiplying clock output corresponding to the frequency-demultiplying data SD is obtained. The time chart shown in FIG. 7 indicates a case when 15 is set as frequency-demultiplying data SD. When SD is arranged to be 15, frequency-demultiplying clock output having a frequency that is 3/2 that of the dot clock DCK is obtained by changing the delay output DLD 15, 10, 05 and 20 in this order for selection.

For example, when it is desired to set a ratio of the frequency of the dot clock DCK to that of the frequency-demultiplying clock to 1:1.8, it is allowed to set 18 as the frequency-demultiplying data SD. By changing frequency-demultiplying data SD in the range of 11 to 19, frequency-demultiplying output having 9 patterns of frequency ratio in the range from 1:1.1 to 1:1.9 are contained.

Figure 8:
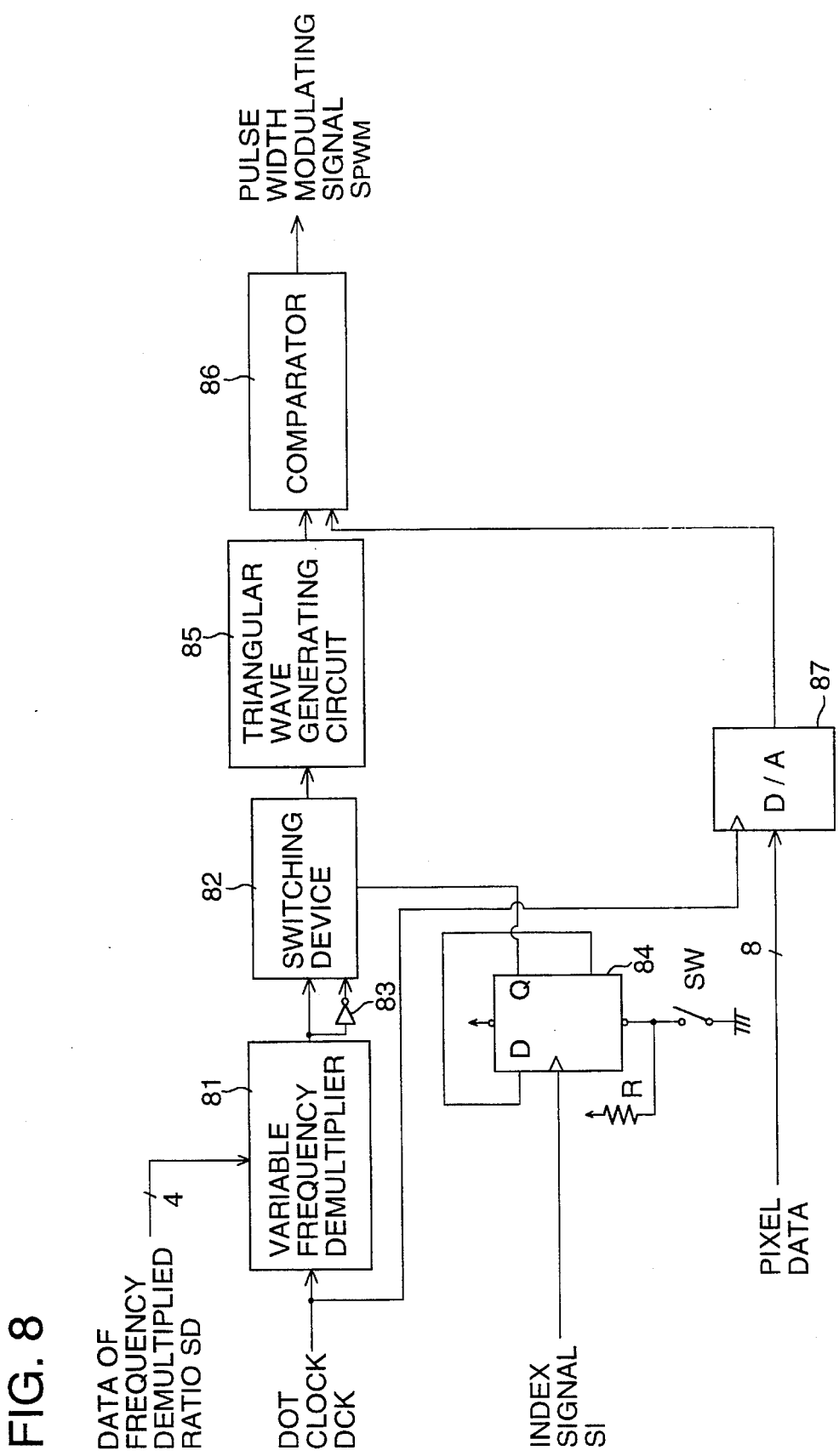
FIG. 8 is a block diagram showing constitution of modulation circuit employing a variable demultiplying circuit.

A modulating circuit generating pulse width modulation signal SPWM by the use of the variable frequency demultiplier is shown in FIG. 8.

In FIG. 8, variable frequency demultiplying circuit 81 is a circuit provided with a constitution shown in FIG. 6, wherein frequency-demultiplied clocks having a frequency of 1.1 to 1.9 times of the frequency of the dot clock DCK are generated in accordance with frequency-demultiplying data SD.

Figure 9:
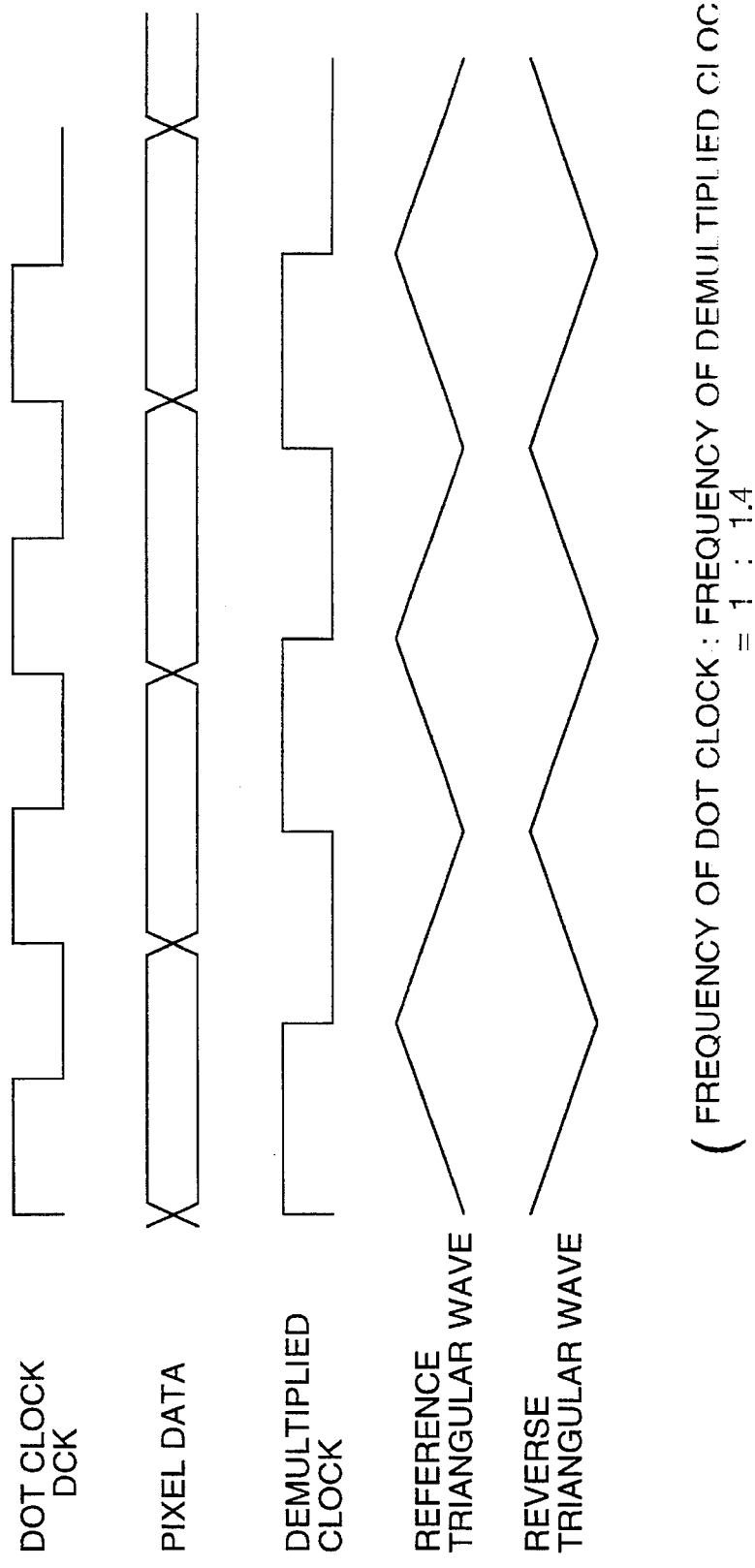
FIG. 9 is a time chart showing behavior of reversing of reference wave.

To switching device 82, output from the variable demultiplier 81 and inverted output from the inverter 83 are inputted. Either of the inputted pulses is outputted selectively in accordance with a selection signal from the flip-flop device 84 (see FIG. 9).

To the flip-flop device 84, the index signal SI and a clock signal are arranged to be inputted. Thereby, output from the variable frequency demultiplier 81 and the inverted output of the aforesaid output are arranged to be outputted from the switching device 82 after being switched for each main scanning line.

Incidentally, SW represents a switch for canceling the inversion of the phase of the pulse signal for each main scanning line mentioned above.

An output pulse from the switching device 82 is supplied to a triangular wave generating circuit 85, where a triangular wave having the same frequency as the input pulse signal is generated as a reference wave. Accordingly, in the constitution shown in FIG. 8, a means for generating a reference wave is constituted by the variable frequency demultiplier 81, the inverter 83, the switching device 82 and the triangular wave generating circuit 85.

The triangular wave (the reference wave) outputted from the triangular wave generating circuit 85 is supplied to the comparator 86 (a means for generating a modulation signal). In comparator 86, image signal Sv obtained by converting pixel data DATA to analog signals by the use of the D/A converter 87 and the triangular wave Sp are compared so that pulse width modulation signals SPWM are generated.

Owing to the modulation circuit having this constitution, a ratio of the frequency of image signal Sv (the frequency of the dot clock DCK) to that of a triangular wave Sp (the reference wave) can be changed to 9 types in a range from 1:1.1 to 1:1.9, depending upon a frequency demultiplying ratio data SD supplied to the variable demultiplying circuit 81.

When using the frequency ratio arbitrary selected from the ratios (Sv/Sp) of 1:1.1 to 1:1.9 satisfying the relation 1:(1+n/m) (provided that n and m are positive integers and n<m), resolution and gradation reproducibility can stand together at a high level, compared with when the frequency ratio is set to be 1:1 or 1:2 (as in the prior art). In addition, when the variable frequency demultiplier as shown in FIG. 6 is employed, (Sv/Sp) can be employed selectively from 9 types of 1:1.1 to 1:1.9 in accordance with each image because the change in demultiplying ratio is easy.

In addition, when the phase of the reference wave is inverted for each main scanning line as described above, reduction of resolution can be inhibited even when the sampling number is reduced compared with cases when the frequency ratio is set to 1:1.

Incidentally, even when modulation is conducted by a constitution as shown in FIG. 1, it is preferable to provide a constitution composed of the flip-flop device 84, the inverter 83 and the switching device 82 as shown in FIG. 8 wherein the phase of the reference wave is inverted for each main scanning line.

As explained above, in the image forming apparatus of the present invention, pulse width modulation signals can be formed correctly without being influenced by a duty ratio change of the dot clock, thereby gradation reproducibility can be improved and resolution can be maintained by using sufficient sampling numbers.

What is claimed is:

1. An image forming apparatus in which an image is formed on a recording material by an imagewise exposure to a light source that is modulated in accordance with an image signal, comprising:

(a) reference frequency signal generating means for generating a reference frequency signal having a predetermined frequency; and (b) means for generating a pulse width modulating signal for modulating a light source based on said image signal and said reference frequency signal, so that a ratio of the frequency of said image signal to said predetermined frequency of said reference frequency signal is set based on a relationship $$1:(1+n/m)$$

where n and m are positive integers and n is less than m.

2. The image forming apparatus of claim 1, further comprising a variable frequency demultiplier for demultiplying a frequency, wherein said ratio is in a predetermined range.

* * * * *